United States Patent [19]

Cheney et al.

[11] 4,057,405
[45] Nov. 8, 1977

[54] MEANS FOR THE CLEANING AND SELF-CLEANING OF AN ELECTROSTATIC PRECIPITATOR

[75] Inventors: William A. Cheney; Wendell P. Spurgin, both of Cincinnati, Ohio

[73] Assignee: United Air Specialists, Inc., Cincinnati, Ohio

[21] Appl. No.: 661,291

[22] Filed: Feb. 25, 1976

[51] Int. Cl.$^2$ ............................................. B03C 3/76
[52] U.S. Cl. ..................... 55/105; 55/111; 55/112; 55/138; 55/139; 55/272; 55/300
[58] Field of Search ............... 55/12, 105, 110, 111, 55/112, 113, 138, 139, 140, 271, 272, 273, 299, 304, 300

[56] References Cited

U.S. PATENT DOCUMENTS

| | | | |
|---|---|---|---|
| 1,630,482 | 5/1927 | Forbes | 55/110 |
| 2,198,618 | 4/1940 | Horne | 55/112 |
| 2,392,088 | 1/1946 | Hamilton et al. | 55/112 |
| 2,490,979 | 12/1949 | Palmer | 55/110 |
| 2,503,617 | 4/1950 | Hamilton | 55/112 |
| 2,634,818 | 4/1953 | Wintermute | 55/112 |
| 2,639,781 | 5/1953 | Savitz | 55/138 |
| 2,699,224 | 1/1955 | Schmitz | 55/112 |
| 2,842,938 | 7/1958 | Burton et al. | 55/112 |
| 3,030,753 | 4/1962 | Dennington | 55/112 |
| 3,113,852 | 12/1963 | Steuernagel | 55/112 |

Primary Examiner—Frank W. Lutter
Assistant Examiner—David L. Lacey
Attorney, Agent, or Firm—Melville, Strasser, Foster & Hoffman

[57] ABSTRACT

The means and method for the cleaning and self-cleaning of an electrostatic precipitator is especially suited for adaptation to an electronic air cleaner comprised of an ionizer unit and a collecting cell unit adapted to be included in tandem within a suitable cabinet; means to bring air to be cleaned through these units are also provided, and these may or may not be an integral part of the cleaner. The ionizer unit may include support members for a plurality of ground plates between which are located ionizing wires which normally carry a low current but high voltage, preferably in the neighborhood of 10,000 to 14,000 volts. (Some electronic air cleaners, however, use voltages in the 5,000 to 9,000 volts range. This invention will also work effectively with them.) The collecting cell unit includes support members for a plurality of grounded collecting plates and there are a plurality of charged collecting plates suitably supported within the collecting cell unit and interleaved among the grounded collecting plates, the grounded plates and charged plates being out of electrical contact with one another. The charged plates normally carry a low current, high voltage charge in the neighborhood of 5,000 to 7,000 volts. The means and method of this invention, however, will function satisfactorily with all known voltage ranges normally applied to the ionizer and collecting cell in a 2-stage precipitator. Hopper means are located beneath the ionizer and collecting cell in position to receive precipitated contaminants which are removed from the air stream passing therethrough and which are intially collected on the various plates.

5 Claims, 8 Drawing Figures

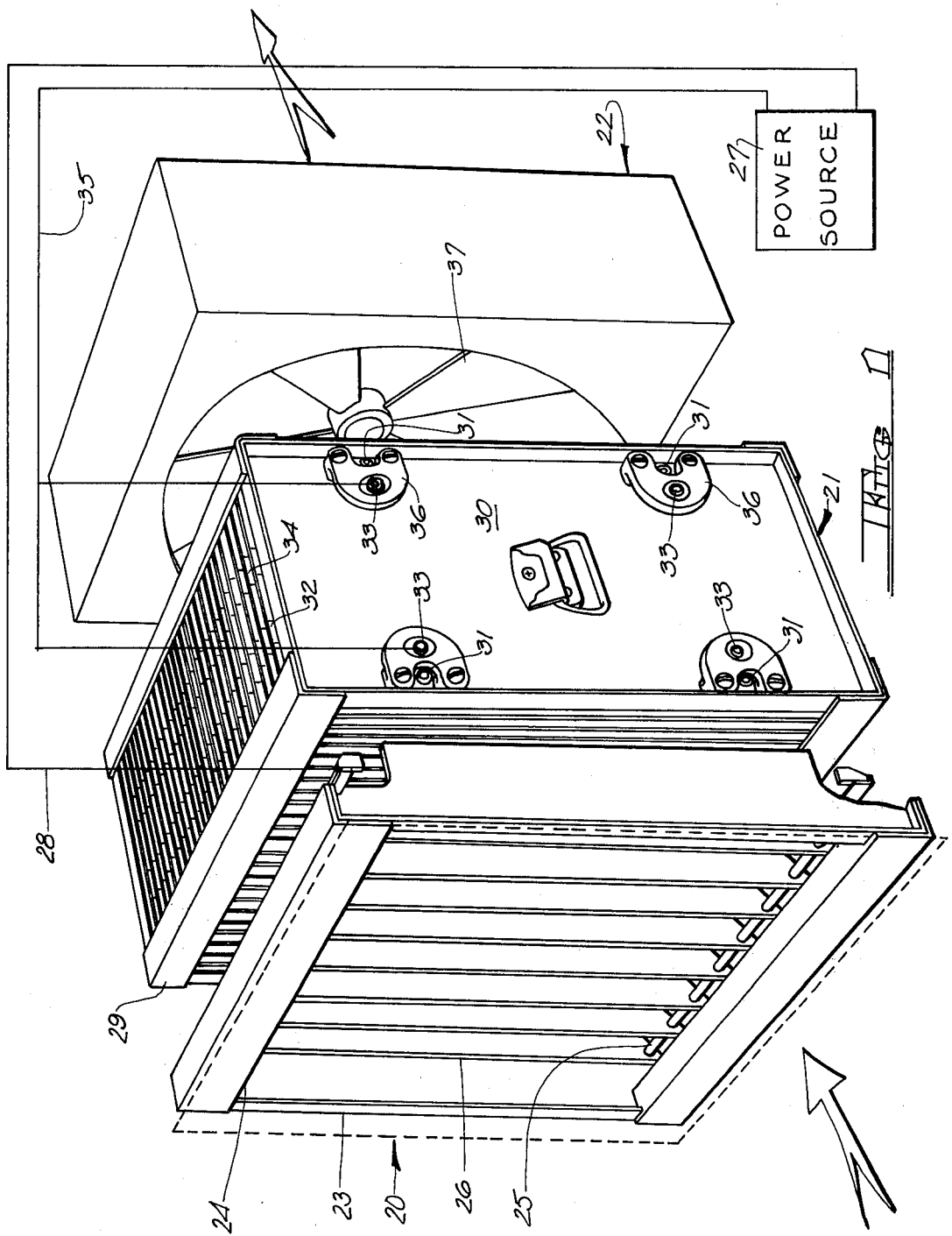

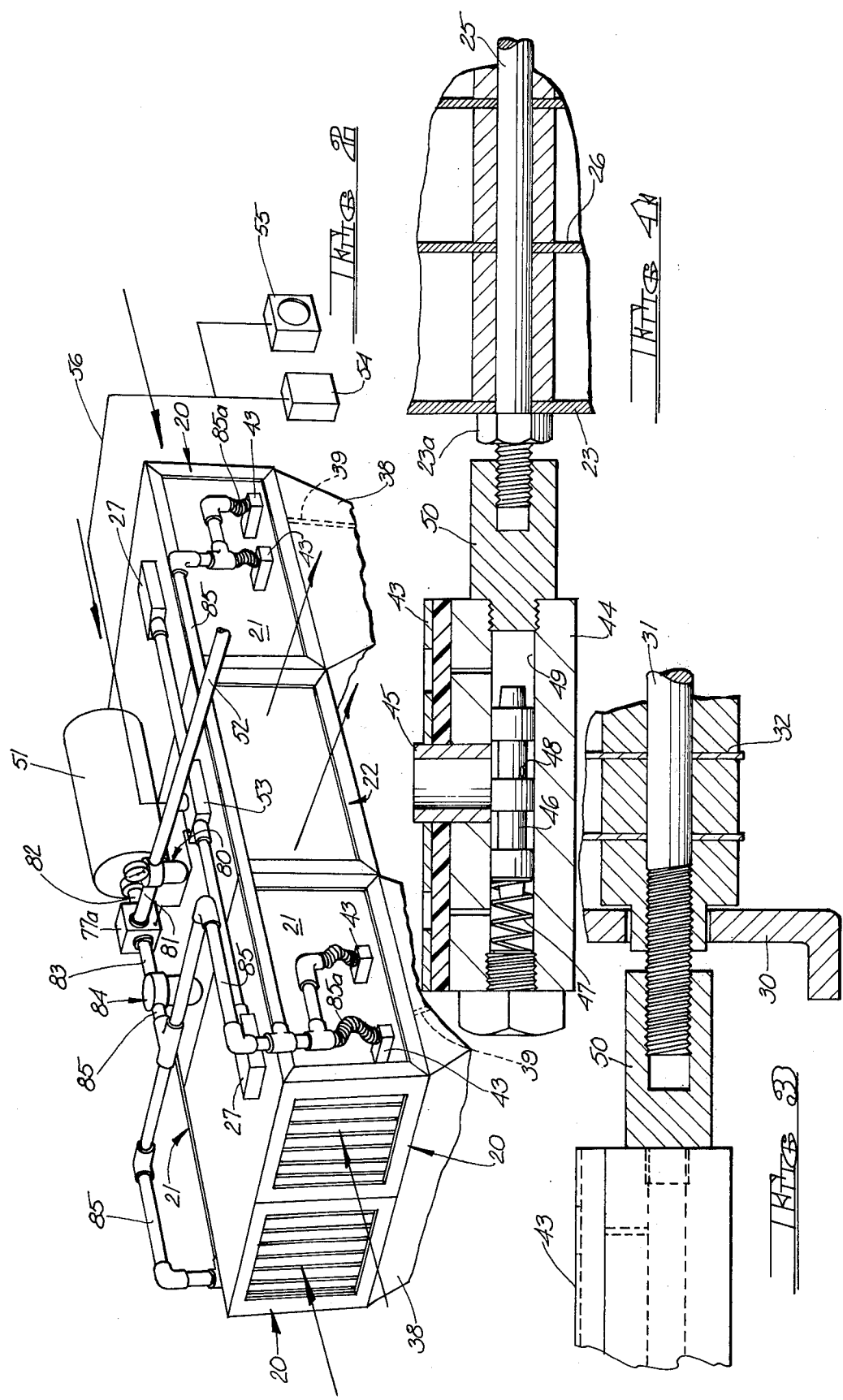

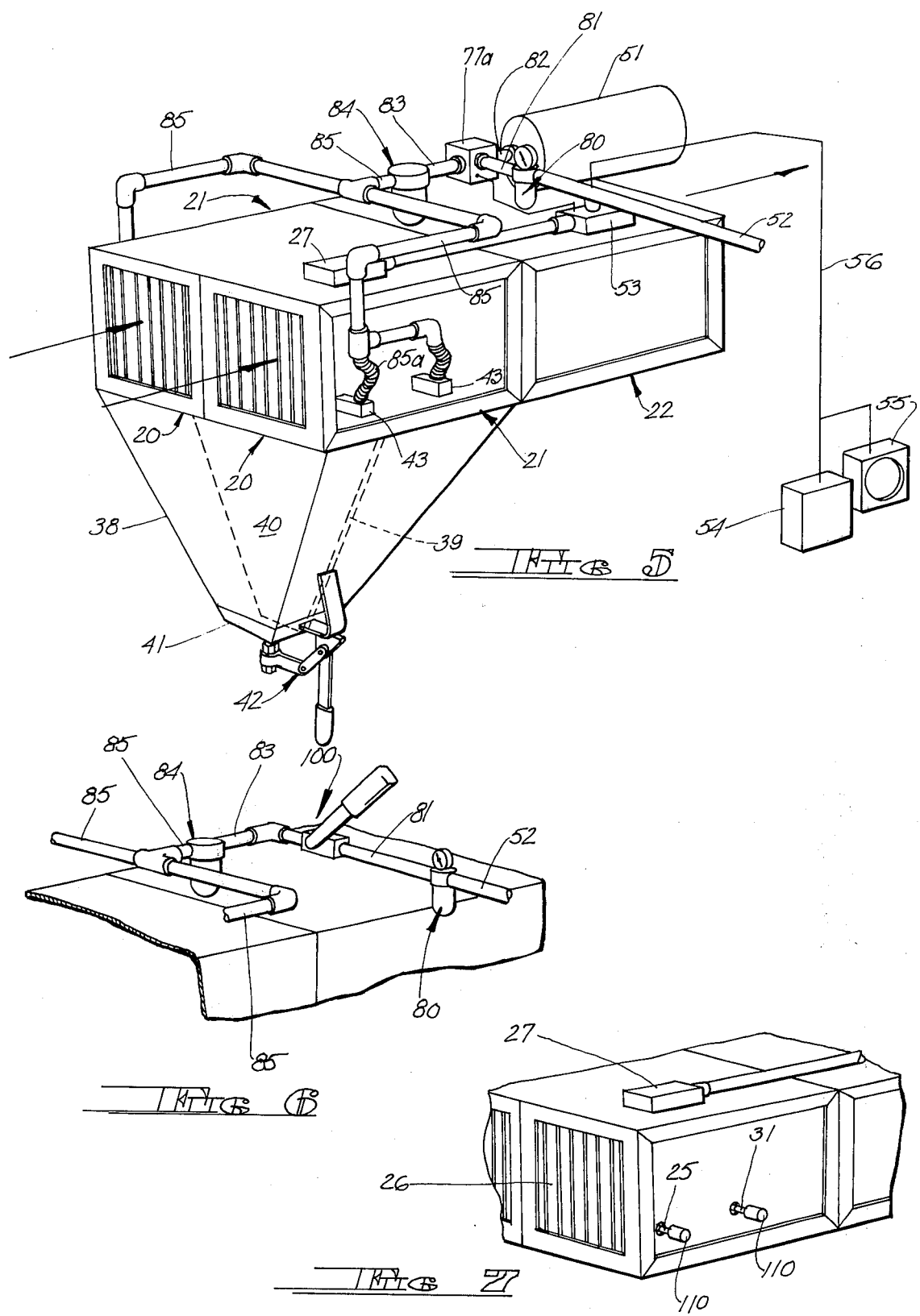

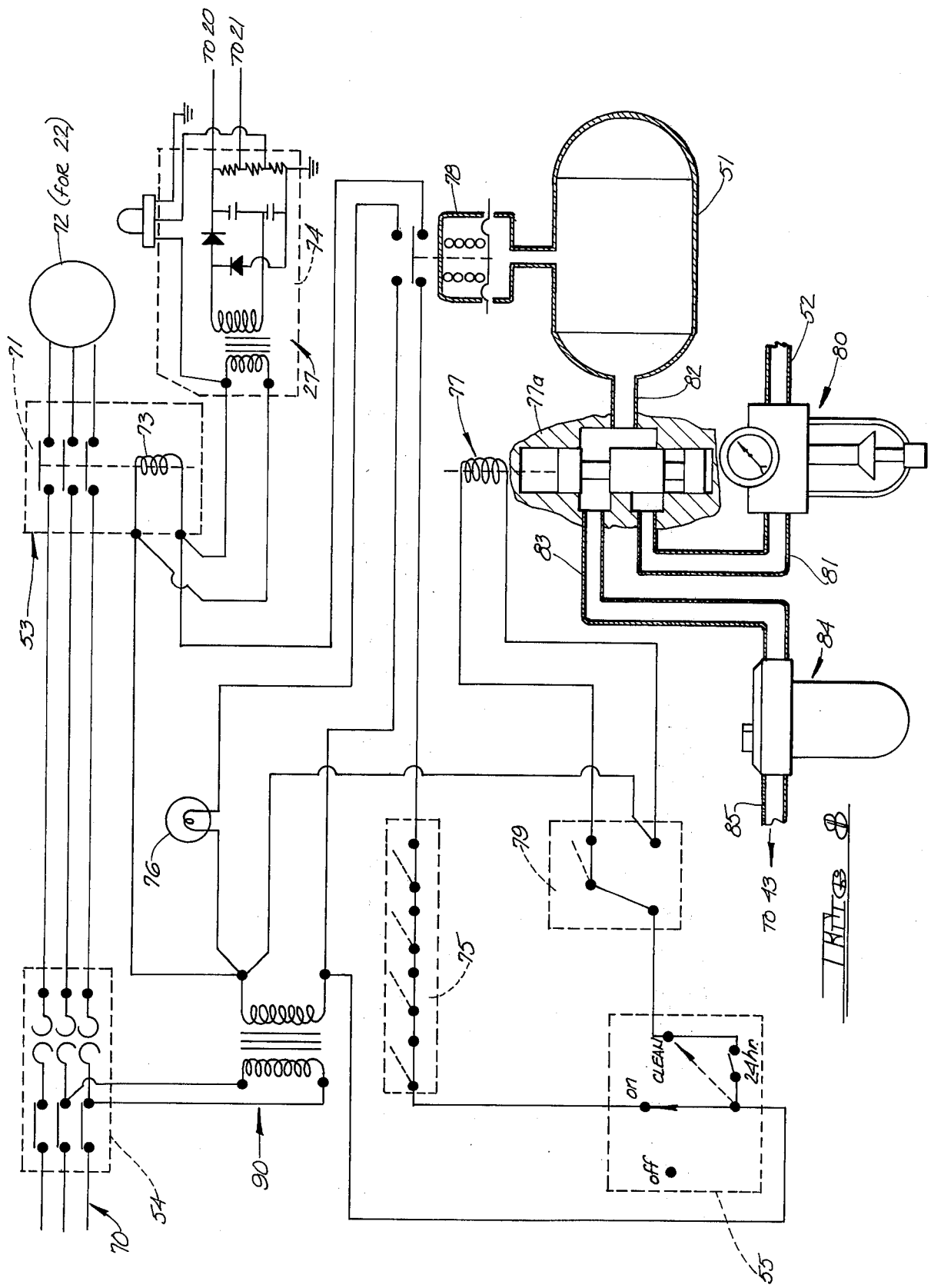

MEANS FOR THE CLEANING AND SELF-CLEANING OF AN ELECTROSTATIC PRECIPITATOR

BACKGROUND OF THE INVENTION

1. Field of the Invention

The electrostatic precipitator, also referred to as a two-stage electrostatic precipitator, or simply as an electronic air cleaner, is useful in cleaning air, particularly in industrial applications, prior to returning it to the atmosphere. The unit has particular application when removing very fine, powder-like particles in the neighborhood of 1 micron and below, although the unit will handle virtually any airborne particles existing in the air stream being treated. It is designed to provide a clean atmosphere while at the same time, in some instances, effecting recovery of materials which may be recycled.

Although the electronic air cleaner of this invention is capable of removing not only dry particulates or contaminants from an air stream, but also of removing liquid particles therefrom, such as when "smoke" is removed from the treated air, the means and method for the cleaning and self-cleaning of such electronic air cleaner are particularly suited for use when only dry contaminants are being precipitated from the air stream being treated. (A significant percentage of "smoke" is often a liquid, but even under those conditions the cleaning means and method of this invention may produce some improvement in dislodging precipitated contaminants from the plates and/or wires on which they collect.)

2. Description of the Prior Art

Electrostatic precipitators as such are known in the art. An ionizer is utilized to produce an electrostatic field so as to charge the particles exposed to it. These charged particles are then passed through a collecting cell comprised of charged and grounded plates such as to pick-up the charged particles or contaminants. Some of the known United States Patents relating to such precipitators and the like are U.S. Pat. Nos. 1,697,316 — Horny; 2,347,709 — Penny; 2,470,356 — MacKenzie; 2,476,248 — MacKenzie; 2,542,262 — Richardson; and 2,642,952 — Landgraf.

There is also some known United States art pertaining more particularly to the removal of precipitated material from the collecting plates. Such art includes the following U.S. Pat. Nos.: Ekstrom — 2,667,941; Palmer — 2,490,979; Gately — 3,605,9155 and Labbe — 1,758,404.

It is known that there are a number of other United States Patents relating to electronic air cleaners but it is believed that those mentioned above are the most pertinent to the instant invention. No assertion is made, however, that such patents are indeed representative of the best art in this area, that is, the art closest to the invention herein shown, described and claimed.

SUMMARY OF THE INVENTION

The invention comprises a means and method for the cleaning and self-cleaning of a two stage electrostatic precipitator in which vibrations are applied directly to the support members on which the contaminant collecting plates are mounted, preferably at a variable frequency. These vibrations, which may also be referred to herein as pulsations or oscillations, have a harmonic mode. By varying the harmonic mode to achieve a variable frequency of the vibrations, pulsations or oscillations, superior cleaning of the contaminant collecting plates is obtained. A given frequency will affect a portion of such a plate. By varying the frequency a greater portion of the plate is affected and a higher percentage of contaminants is dislodged from the plate.

One manner of realizing the advantages of the invention is to use pneumatic vibrators fastened directly to the rods on which the particle collecting plates or wires are mounted. This may be accomplished by supplying a tank of air which is filled with air at a given pressure whereafter the tank is permitted to empty. As the air supply runs down the frequency of vibrations emitted by the vibrators decreases. This variable frequency causes a greater percentage of the plates or wires to be vibrated whereby to dislodge a greater percentage of contaminants. Such an air tank may be an integral part of the electronic air cleaner or it may be a portable unit which may be attached to an electronic air cleaner during those times the cleaner is to itself be cleaned by dislodging contaminants from the collecting plates or wires. (It is to be understood that although it will often be the ground plates to which the bulk of the particles will attach, some may also attach to the charged plates and ionizer wires, and these may also be removed by vibration.)

Variable frequencies in the pneumatic vibrators may also be achieved by connecting the vibrators directly to an air line which supplies air at a given pressure and interposing a valve in the line by which the air pressure may be varried. Such a valve may be mechanically operated or connected to a suitable motor and timer.

It is within the scope of the invention to provide electrical vibrators attached directly to the rods on which the ground plates are located. It is important that the vibrations be applied directly to such rods. It has also been found quite beneficial to vary the frequency of such vibrations.

In some instances it may not be feasible to utilize either pneumatic or electrical means to effect cleaning of a two stage electrostatic precipitator. Some of the benefits of this invention may be realized even under these conditions by providing means on the support members for the contaminant collecting plates, which means may receive a mechanical blow such as may be delivered by an operator and a suitable mallet and the like. The fact that such blow is delivered directly to the support rod is important. This itself will effect an increase in the efficiency of cleaning the unit. Even under these conditions further benefits of the invention may be realized if the blows are struck so as to produce the variable frequency of the imparted vibrations.

BRIEF DESCRIPTION OF THE DRAWINGS

FIG. 1 is an exploded, fragmentary perspective view, partly schematic and partly diagramatic, disclosing the basic components of a two stage electrostatic precipitator to which the invention may be supplied.

FIG. 2 is a fragmentary perspective view, partly schematic and partly diagramatic, showing one form of the invention as applied to an electronic air cleaner comprised of a multiplicity of the components illustrated in FIG. 1. FIG. 3 is a fragmentary sectional view depicting the application of a vibrator unit to the ground rod for the contaminant collecting plates of a typical collecting cell unit.

FIG. 4 is a fragmentary sectional view generally similar to that of FIG. 3 but illustrating the vibrator in greater detail and depicting it as applied to the support rod for the plates utilized within the ionizer unit of an electronic air cleaner.

FIG. 5 is a perspective view, partly diagramatic and partly schematic, depicting one form of the invention as applied to an electronic air cleaner comprised of multiple components making up a two stage electrostatic precipitator.

FIG. 6 is a fragmentary perspective view of a modification of the invention depicting the use of a valve in an air line in place of the air tank employed in the modifications of FIGS. 2 and 5.

FIG. 7 is a fragmentary perspective view of that modification of the invention wherein cleaning may be effected by application of a mechanical blow directly to the end of the support member for the contaminant collecting plates.

FIG. 8 is a schematic diagram for use with that form of the invention which employs a tank of compressed air to effect the variable frequency of vibrations and the like.

DESCRIPTION OF THE PREFERRED EMBODIMENTS

Referring first to FIG. 1, the electronic air cleaner is depicted as a two stage electrostatic precipitator comprised of an ionizer generally indicated at 20, a collecting cell generally indicated at 21, and an air mover generally indicated at 22. Preferably the air mover 22 will draw air first through the ionizer 20 and then through the collecting cell 21. The air mover 22 may be located close by the ionizer 20 and collecting cell 21, and may even be included within the same cabinitry, or it may be located at some convenient area which, however, may be quite remote from such ionizer and collecting cell. Baffle means or suitable air blocks, not shown, are provided, in the cabinet or elsewhere, to insure that the air to be treated is directed completely through the ionizer and collecting cell.

The ionizer 20 is designed to produce an intense electrostatic field which charges virtually every particle exposed to it. It is comprised of appropriate frame members 23 and 24 and support members or rods 25 on which are mounted a plurality of ground plates 26 between which are located ionizing wires (not shown). These plates and wires create an intense ionizing field. Such ionizing wires are connected to a suitable power source 27 of electricity as generally indicated at 28. Some dry contaminants are precipitated within the ionizer 20 and will collect there within, largely on the ground plates 26.

The collecting cell 21 is comprised of suitable frame structure 29 and 30 and upper and lower support members or rods 31 on which are mounted a plurality of grounded collecting plates 32. Upper and lower charged rods 33 support charged plates 34 which are interleaved among the grounded collecting plates 32 within the collecting cell 21. The charged rods 33 are connected to the power source 27. The plates 32 and 34 are spaced from one another and the rods 33 are connected to the frame structure 29, 30 by means of suitable insulators 36 so that the charged rods 33 and charged plates 34 are out of ground contact with all the other components comprising the collecting cell 21.

In practice the ionizer wires of the ionizer unit 20 may carry a low current but high voltage in the neighborhood of 10,000 to 14,000 volts while the charged rods 33 of the collecting cell unit 21 may carry a low current, high voltage in the neighborhood of 5,000 to 7,000 volts. Other voltage ranges, however, may be employed for either or both of the ionizer and collecting cell. This invention is effective with all such known voltage ranges normally used in 2-stage precipitators.

Depending somewhat on the nature of the type and quantity of charge applied within the ionizer and within the collecting cell, dry precipitated contaminants will collect on all of the plates 32 and 34, and to some extent on the plates 26 and even the ionizer wires, but mostly on the ground plates 32. It is important that these ground plates 32 be so spaced from the charged "hot" rods 33 and plates 34, and that such charged members be so spaced from the grounded frame structure 29, 30, that optimum field gradient is achieved; this is to minimize any chance for precipitated particulate buildup to bridge across from any of the charged members to any of the grounded members so as to minimize the possibility of short-out.

The air mover 22 is of a type well known in the art and includes a motor, not shown, which may drive a suitable centrifugal blower or, in the case of the particular air mover depicted in FIG. 1, the fan blades 37. It is designed to draw a stream of air first through the ionizer 20 and then through the collecting cell 21. Although it would be possible to locate the air mover 22 at the input side of the ionizer 20 so as to push air through the system in "positive" manner, it is preferable to draw (i.e., use "negative" pressure) the air through the ionizer and the collecting cell in that order as indicated by the arrows in FIG. 1. And, as indicated above, the air mover may be located quite remote from the ionizer and collecting cell. The important thing is simply that it be effective to move air through the cleaner.

A collecting hopper is disposed beneath the electronic air cleaner. Such a hopper is indicated at 38 in FIG. 5. FIG. 5 depicts an electronic air cleaner made up of a pair of the components 20, 21 of FIG. 1, such components being placed side-by-side. The blower 22 will draw air through all of the components and discharge it in the direction indicated. The collecting hopper 38 is disposed beneath all of the components comprising the two stage electrostatic precipitator; that is, it will collect contaminants removed from both of the ionizers 20 and both of the collecting cells 21. A baffle 39 is provided within the hopper 38 and located at the juncture of the ionizers 20 with the collecting cells 21. This baffle 39 prevents air drawn through the cleaner from unduly disturbing and agitating the dry contaminants collected within the hopper 38 as such air is drawn through the cleaner by the mover 22.

The collecting hopper 38 is disposed beneath those ionizers 20 and collecting cells 21 which make up the cleaner. When these units are located in a common cabinet and the like, the bottom of such cabinet will be open so that the collecting hopper 38 may be exposed to the full interiors of the ionizers and collecting cells. The four side walls 40 of the collecting hopper 38 slope downwardly to a discharge spout located centrally of the hopper and normally closed by an air-tight gate 41. This gate may be opened for removal of collected contaminants by the handle and linkage mechanism generally indicated at 42.

An important feature of this invention is to insure that the electronic air cleaner not only efficiently removes dry contaminants from the air being treated but also that such contaminants may be periodically removed from the various collecting plates and gathered in a hopper in such manner that they will not be drawn back into the stream of air being treated. Although some of the contaminants precipitated from the air stream as it passes through the ionizer 20 and collecting cell 21 may fall by gravity and otherwise of their own accord into the collecting hopper 38, most will collect on the plates 26, 32 and 34 in varying degree. It is necessary, therefore, periodically to loosen these precipitated particulates so that they do not build up within the various units in such manner as to decrease their air cleaning efficiency or even to render them inoperative. This invention, therefore, in its preferred form, embraces the use of a plurality of vibrators 43 (see FIGS. 2 and 5) fastened directly to the rods 25 and 31 on which the ground plates 26 and 32 are supported within the ionizer 20 and collecting cell 21 respectively. These vibrators 43 are actuated periodically to loosen the precipitated particulates which have gathered on the various collecting plates and which particulates are collected in the hopper 38.

A preferred form of the invention is illustrated in FIGS. 2 through 5 and 8. The arrangement of FIG. 2 differs from that of FIG. 5 essentially only in that the FIG. 2 arrangement utilizes four two stage electrostatic precipitators, a pair on opposite sides of the air mover 22, and the arrangement is such that air to be cleaned is drawn in through the four ionizers 20 and collecting cells 21 and discharged centrally of the apparatus. In the arrangement of FIG. 5 only two electrostatic precipitators are employed, both on the same side of the air mover 22, and movement of air to be cleaned is straight through as shown by the arrows and as generally indicated in the arrangement of FIG. 1 as well. The vibrators 43 in these FIGURES are conventional and are comprised of a pneumatic cylinder 44 having an air inlet 45, an oscillating piston 46 and a spring 47. An axial bore extends through the piston 46 and connects with a port 48 which communicates with the cylinder chamber 49 which receives compressed air via the inlet 45. It will be understood by those skilled in the art that application of compressed air to the inlet 45 will result in oscillation of the piston 46 within the cylinder chamber 49 and such oscillation will impart vibrations or pulsations to the respective rods 25 and 31 to which the vibrators 43 are connected by the appropriately threaded connectors 50.

The oscillating piston 46 is responsive to the air pressure entering via the conduit 45. The higher the incoming pressure, the more rapid are the oscillations and the higher the frequency of vibrations or pulsations imparted to the respective rods 25 and 31. As the air pressure decreases, so also do the oscillations of the piston 46 and the resultant frequency of vibrations or pulsations imparted to the rods 25 and 31 respectively. As best seen in FIGS. 3 and 4, the connecting members 50 are attached directly to the rods 25 and 31 and do not come into direct contact with either the ionizer frame structure 23 or the collecting cell frame structure 30. Preferably the rods 31 are supported independently of the frame structure 30 so that vibrations are applied directly to the ground plates 32 of the collecting cell 21 so as to most efficiently use the energy put into this relatively heavy cell. The ionizer, however, is relatively lighter and a smaller amount of energy may accomplish the required vibratory response. Thus, while the vibrator 50 is connected directly to the rod 25 as in the case of the rod 31, the rod 25 may also be connected to the ionizer frame 23 via the nut 23a; it is to be understood, however, that the arrangement could be like that shown at 30, 31 in FIG. 3.

In the arrangement of these FIGS. 2 through 5 and 8 air is supplied to all of the pneumatic vibrators 43 from a compressed air tank 51 which receives compressed shop air via the conduit 52.

The power source for the respective two-stage electrostatic precipitators comprised of an ionizer 20 and collecting cell 21, all as generally indicated in FIG. 1 and as incorporated into the arrangements of FIGS. 2 and 5, is again indicated by the reference numeral 27. Such power source 27 may be comprised of a high voltage transformer. The transformer 27 will be electrically connected to the main control housing 53 which in turn is electrically connected to the manual starter 54 and selector switch 55 via the line 56. The member 54 will be connected to an appropriate source of electrical power as is well known in the art. All of this will become more clear from an examination of FIG. 8 to which reference is now made.

Electrical energy for the air cleaning unit is diagramatically illustrated as coming from a suitable outside source as generally indicated at 70 in the upper left hand corner of FIG. 8. An initial control may be effected by the manual starter 54. The selector switch 55 is shown as having an "off", an "on", and a "cleaning" position. A "24 hr." position is also indicated. In reality this latter position refers to a time actuated switch. Such switch is closed for a short period of time, on the order of 2 minutes per hour or 20 minutes per 10 hour period. Timers can be obtained or set up for a variety of time intervals such as 8 hr., 12 hr., 24 hr., etc. The automatic cleaning period may be selected depending upon the needed frequency of cleaning.

The main control housing 53 contains the magnetic contactor 71 which is operatively connected to the motor 72 for the air mover 22. The unit 71 is also operatively connected through a coil 73 to the power pack 74 which may be considered as a part of the high voltage transformers 27 which supply energy to the ionizers 20 and collecting cells 21. The system is illustrated as including a series of door and lid interlocks, normally closed, which are diagramatically illustrated as contained within the unit 75. An indicator lamp 76 will be lit during the cleaning cycle for the electronic air cleaner. A solenoid valve 77 for the air tank 51 is provided along with a pressure switch 78 which is normally closed during the "on" air cleaning cycle of the unit. The unit "clean" circuitry also includes the re-set timer 79.

Shop air enters the unit via the conduit 52 and passes through a combination pressure regulator and filter generally indicated at 80. Air is fed from the pressure regulator and filter 80 via the line 81 into the tank 51 via the line or conduit 82 in accordance with the solenoid valve 77 and valve unit 77a. When the collector plates are to be rid of their collected contaminants, air under pressure will exit the tank 51 via the conduit 82 and valve unit 77a and then through a conduit 83 having an air line lubricator 84 therein. Compressed air to all of the vibrators 43 exits through the conduit 85.

In operation, when the manual starter 70 has been actuated, and the selector switch 55 has been moved to the "on" position as indicated in FIG. 8, the electronic air cleaner will effect precipitation of contaminants from the air being passed through it. Such electronic air cleaner may be comprised only of the pair of basic components, the ionizer 20 and collecting cells 21, along with the air mover 22, illustrated in FIG. 1, or it could be the more elaborate cleaner depicted in FIG. 5, or the still more elaborate unit depicted in FIG. 2. In any event, during operation of the ionizer, collecting cell and air mover, the circuitry is such, as illustrated in FIG. 8, that no compressed air is being taken in from the shop air line 52 and the tank 51 will be empty. Such condition assumes also that the door and interlocks diagrammatically represented at 78 will all be closed, as would be the case if the unit is in proper operating condition. A step down transformer 90 will normally be included in the operating circuitry for the ionizer, collecting cell and air mover.

When the selector switch 55 is moved to the "clean" position the operating electrical circuit for the ionizer 20, collecting cell 21 and air mover 22 is broken. At the same time a circuit is completed through the re-set timer 79, the solenoid valve 77 and the indicator lamp 76. The reset timer is such as to hold this circuit for a designated time, on the order of 2 minutes. During such time the valve 77a is actuated to permit shop air, filtered and pressure regulated by the unit 80, to enter via the conduit 52 and conduits 81, 82 to fill the compressed air tank 51. As this occurs the pressure switch 78 is actuated and this provides another break in the normal operating circuitry for the electronic air cleaner, thus providing a further safety factor; in addition the indicator lamp 76 will be lit upon actuation of the switch 78 in response to tank pressure.

After the predesignated time set for the reset timer 79 has expired, it will open, and the solenoid valve arrangement 77, 77a will permit compressed air in the tank 51 to flow through the conduits 82 and 83 through the air line lubricator 84 and then through the conduit 85 and thence to all of the vibrators 43. Such compressed air, in its initial movement to the vibrators, provides the high pressure shock pulse which appears necessary to initiate the pulsating action of the vibrators.

As the supply of compressed air in the tank 51 diminishes, the vibrations or pulsations emitted by the vibrators 43 which include the oscillating pistons 46, will decrease. This provides the variable frequency which is important to effective cleaning of ionizer plates 26 and grounded collecting cell plates 32. These plates are, as described earlier, mounted on support members to which the respective vibrators 43 are directly attached. In order to insure that the vibrators and pulsations are concentrated on the support members to which the vibrators 43 are fixed, and on which support members the plates to be cleaned are mounted, the connections 85a between the conduit system 85 and vibrators 83 should be flexible.

As the air tank 51 empties, pressure runs down and the vibrators decrease in frequency and force, primarily frequency. This is a preferred way of applying a variable harmonic mode to the collecting plates making up an important part of the two stage electrostatic precipitator to which this invention is particularly well suited. This provides a quite thorough dislodging of precipitated contaminants previously deposited on such plates by reason of the fact that vibrations and pulsations of varying frequencies will reach various portions of the plates; the greater the variety of the frequencies applied, the greater the area of plate that will be affected.

Another advantage of applying variable frequency vibrations to the contaminant collecting plates is that any given object usually has a resonance frequency of its own. Prolonged vibrations applied at such resonance frequency can destroy such object. By applying a variable frequency to the object, in this case the contaminant collecting plate and associated supports, the danger of destruction through misapplication of a resonance frequency is avoided.

The general arrangement of FIG. 8 includes another feature, namely, the automatic "24 hr." actuating means previously mentioned. Timing means (not shown) are arranged to actuate the "24 hr." (for example) switch to close position once every 24 hours for 15 minutes. This will again complete a circuit through the reset timer 79 to the solenoid valve 77 whereby again to permit the tank 51 to be filled with compressed air for a period of about 2 minutes whereafter the reset timer will open and the compressed air within the tank 51 will exit to actuate the vibrators 43 as before. As the compressed air tank 51 fills with compressed air during this time (note that even though the "24 hr." switch may be closed for 15 minutes, the reset timer will adhere to its 2 minute cycle), the pressure switch 78 will insure that all power lines to the two stage electrostatic precipitator itself are broken so that no vibrations are applied to the contaminant collecting plates while any of the units 20, 21 and 22 are in operation, and the lamp 76 will be lit, thus serving as a warning that the precipitator should not be actuated while vibration cleaning is in progress. As earlier indicated the automatic timer may be pre-set as desired; the "24 hr." position is depicted only as an example.

A modification of the invention has been illustrated in FIG. 6. Where appropriate, like reference numerals have been used to designate like parts. In the arrangement of FIG. 6 the compressed air tank 51 has been eliminated and replaced by a regulating valve 100. The function of this valve is to physically control the air pressure flowing through the conduit 52 and then through the conduit 83. An operator may manually move this valve so as to decrease, or increase, the pressure flowing through the conduit 83 to the conduit 85 and the vibrators 43. It is the change in the pressure of the air entering the vibrators 43 which causes variations in the oscillations of the vibrator pistons 46 and, therefore, in the vibrations and pulsations applied to the support members 25 and 31 for the contaminant collecting plates 26 and 32.

Although not shown, it is within the realm of the invention to have the regulator valve 100 operated by a motor and timer. Note that while in the arrangement utilizing the compressed air tank 51 it is contemplated that the air pressure will go from a high to a low whereby to achieve the desired variable frequency emphasized herein, it is not always necessary that frequency vary in that direction. As may be controlled by an arrangement such as the valve 100, pressures may go from an initial low to an eventual high. The important thing is to achieve the variable frequency, particularly at the very point where the contaminant collecting plates are most directly affected. The concept of increasing pressure is to control vibration within the limits of handle movement. On a gradually increasing air pressure, the vibrators may not start; as before mentioned, there should be an initial high pressure shock pulse. Thus the valve should be opened rapidly and then retarded within the modulating range for continued actuation of the vibrators at varying frequencies.

A somewhat more simple modification of the invention is illustrated in FIG. 7. In this arrangement the rod 25 which supports the ionizer plates 26, and the rod 31 which supports the collecting cell plates 32, are extended well beyond the exterior of the unit and provided with suitable members 110 which may be struck by a mallet or the like swung by an operator. Although this arrangement lacks some of the refinement achieved by those previously described herein, it does make use of that part of the invention which teaches that desired and improved results are obtained simply by concentrating the vibrations and pulsations at the very spot where they have now been found to be most effective, namely, on those members to which the contaminant collecting plates are affixed.

By way of brief summary this invention, particularly as applied to a two stage electrostatic precipitator, resides in part in the discovery that a significantly higher percentage of contaminants may be dislodged from a plate on which they have collected by applying vibrations or pulsations directly to the support member on which the plate is mounted. Specifically, in the case of a two stage electrostatic precipitator, the best results are obtained by imparting vibrations to the ground rods on which the grounded contaminant collecting plates are located within the ionizer and the collecting cell.

This invention is heightened by the further discovery that if the vibrations and pulsations so administered to the ground rod are varied in frequency, even better results are obtained. In this connection it has been determined that a given frequency will affect a particular portion of a contaminant collecting plate; by varying the frequency of vibrations and pulsations, by creating a difference in the harmonic mode applied to the plate, a greater area of the plate is reached and affected by such vibrations and pulsations and increased efficiency of plate cleaning is achieved.

Briefly stated then, it is both the place and manner of application of the vibrations and pulsations which produce the improved results.

It will be apparent to those skilled in the art that modifications may be made in the means and method for the cleaning and self-cleaning of an electrostatic precipitator without departing from the scope of the invention set forth herein. Some of these modifications, such as provision for the mannual rapping of the support rods for the grounded plates and the provision of a valve directly in the air line to effect pressure control, have been illustrated herein. Others, such as the use of electrical means to provide the vibrations and pulsations for the members which support the grounded contaminant collecting plates, have been mentioned as possibilities. Another possibility is to provide a unit such as that shown in FIG. 5 or in FIG. 2 with all of the apparati except the air tank 51. A number of such units, minus an integral air tank 51, could be employed within a given area. At such time as it became necessary to clean one of these units, a tank 51, mounted on a cart or the like, could be wheeled into position and connected to the balance of the apparati in the region of the conduit 82. This, of course, would mean that only one such unit could be cleaned at a time but a possible saving in the number of tanks 51 required could be achieved.

It is to be further understood that while the invention has been described in terms of certain particular structures and arrangements, the invention is not to be limited to these particular structures and arrangements except insofar as they are specifically set forth in the subjoined claims.

Having thus described the invention, what is claimed as new and what is desired to be protected by Letters Patents is:

1. A two stage electrostatic precipitator comprising: an ionizer; a collecting cell; an air mover for moving air first through said ionizer and then through said collecting cell; contaminant collecting plates in said collecting cell and a plurality of upper and lower support members on which said plates are directly mounted adjacent their four corners; hopper means disposed beneath said ionizer and said collecting cell so as to receive contaminants dislodged from said plates; power means to actuate said ionizer, said collecting cell and said air mover; vibration directing means to apply vibrations of variable frequency directly to one of said lower support members and at right angles to said plates whereby to dislodge contaminants from said plates into said hopper means; said vibration directing means including a vibrator operatively connected to said one lower support member, and control means to actuate said vibrator; interlock means operatively connecting said power means and said control means to prevent simultaneous actuation of said power means and said vibrator; additional means for said control means and said vibrator to vary the frequency of said vibrator, said additional means comprising a source of compressed air and a tank operatively connected to said source, said tank of compressed air being connected to said precipitator and emptied while actuating said vibrator; and a first electric circuitry connected to and including said power means, a second electric circuitry connected to and including said control means, and said interlock means including a switch arrangement operatively connected in said first and in said second electric circuitry and having an off position whereat both the said power means and the said control means are inoperative, an on position whereat only the said power means is operative, and a clean position whereat only the said control means is operative.

2. The precipitator of claim 1 including a re-set timer in said second circuitry whereby said control means is operative only for a given time when said switch arrangement is at its clean position.

3. The precipitator of claim 2 including a pressure switch between said tank and said power means to further insure that said power means is inoperative when said switch arrangement is at its clean position.

4. The precipitator of claim 1 including an additional position for said switch arrangement whereby said clean position is automatically actuated a given length of time once during a longer length of time.

5. The precipitator of claim 1 including ground plates in said ionizer, a lower support member in said ionizer on which said ground plates are directly mounted, and said vibration directing means including an additional vibrator operatively connected to said last mentioned lower support member and to said control means, whereby said vibrator and said additional vibrator are actuated together.

* * * * *